Figure 1:
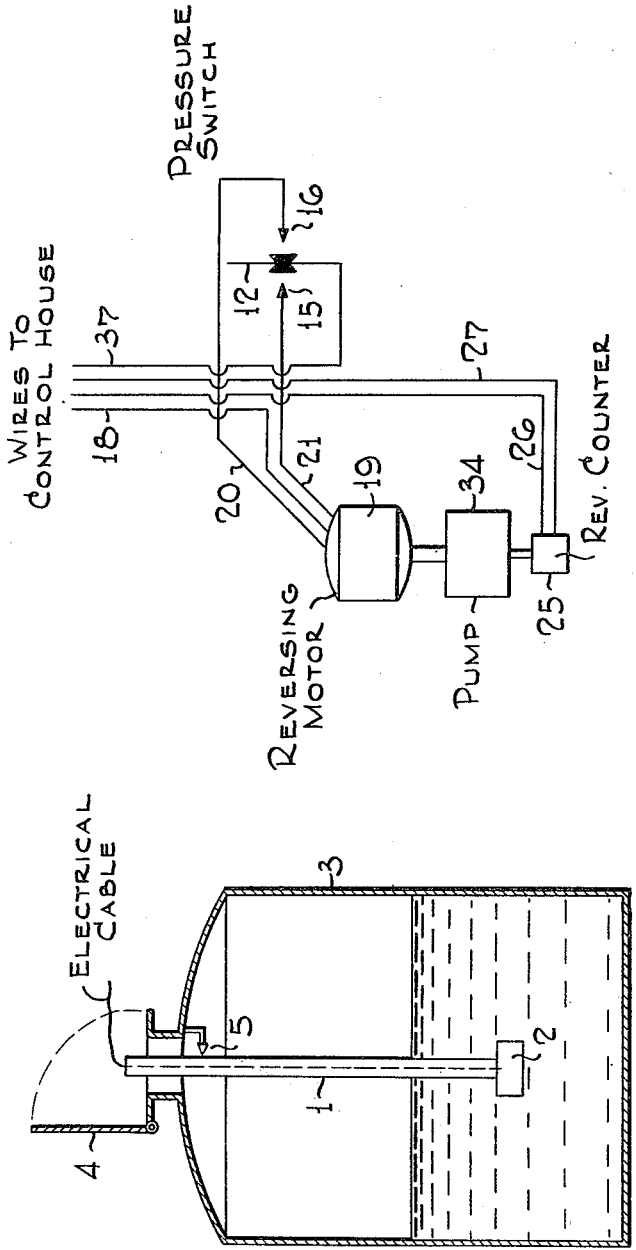

Sept. 15, 1953 J. J. HEIGL 2,651,938
TANK GAUGING APPARATUS
Filed May 31, 1950 2 Sheets-Sheet 2

John J. Heigl Inventor
By W. O. Heilman Attorney

Patented Sept. 15, 1953

2,651,938

UNITED STATES PATENT OFFICE 2,651,938

TANK GAUGING APPARATUS

John J. Heigl, Cranford, N. J., assignor to Standard Oil Development Company, a corporation of Delaware Application May 31, 1950, Serial No. 165,169

5 Claims. (Cl. 73—290)

1

This invention relates to improved apparatus for gauging the fluid level in a tank. The apparatus is particularly adapted for the indication of tank levels in control houses or any desired place removed from the tank. The novel gauging apparatus of this invention consists of a standpipe, to be inserted in the tank to be gauged, in combination with a reversible positive action pump operated to maintain the level of fluid in the standpipe equal to that in the tank. Rotation of the pump to maintain this fluid balance is employed as an indication of the fluctuation of liquid levels in the tank above or below a reference level.

The necessity of accurately determining the quantity of liquid in a storage tank has been an old and difficult problem to meet. While the problem appears to be basically simple, practical considerations have shown the disadvantages of most or all of the presently known methods for gauging a tank. For example, use of a simple gauge stick is frequently impossible in cases in which the liquid to be gauged is very volatile since no indication of liquid level can be found on the gauge stick. It is consequently the principal object of this invention to provide an improved gauging apparatus overcoming disadvantages of presently known gauging methods.

It is a further and more specific object of this invention to provide a relatively simple and effective gauging device which will remotely indicate the fluid level in a storage tank.

The manner in which these objectives are attained may best be understood by reference to the accompanying drawings diagrammatically illustrating one embodiment of this invention. In the drawings:

Fig. 1 diagrammatically shows in cross sectional elevational detail the positioning of the novel apparatus in a tank to be gauged.

Figure 2:
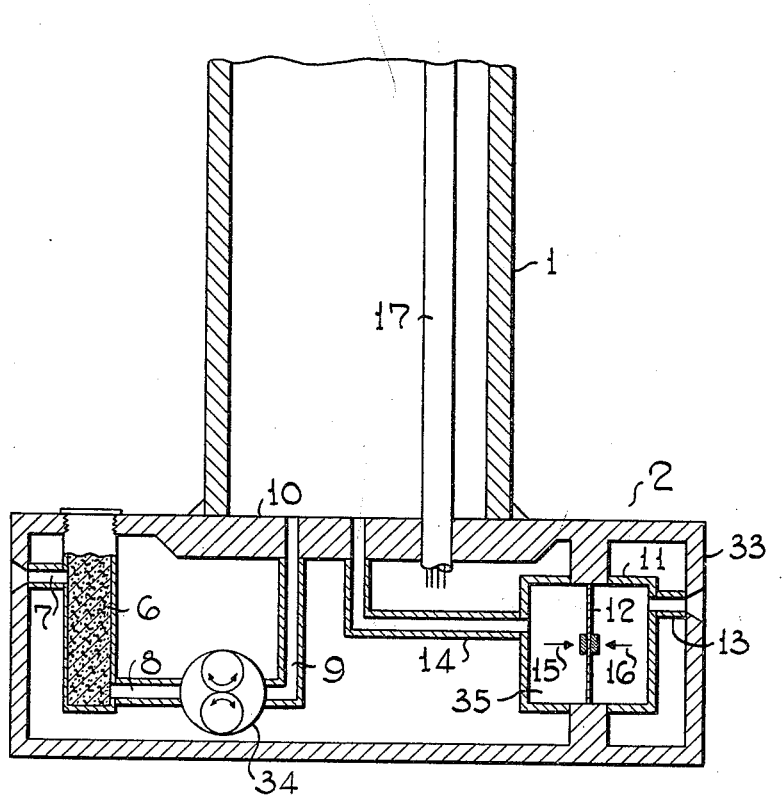

Fig. 2 illustrates in cross sectional detail the lower portion of the apparatus employed for gauging and represents a detailed drawing of the lower portion of the pipe illustrated in the tank of Fig. 1.

Finally, Fig. 3 diagrammatically shows an electrical wiring diagram for the components of the gauging device.

Referring to the drawings then, it may be noted that the gauging apparatus of this invention generally consists of a standpipe, at the bottom of which is positioned a positive displacement pump. The pump is connected with the standpipe so that fluid may be pumped either into the standpipe or out of the standpipe. This entire apparatus is lowered into a tank which is to be gauged. Thus, as shown in Fig. 1, the apparatus consisting of the standpipe I and the pump unit 2 can be lowered into the storage tank

2

3 through the manhole 4. The gauging device may be placed in the tank so that the pump unit 2 touches the bottom of the tank or the pump unit may be maintained at a given distance above the bottom of the storage tank. In any case, it is necessary to know the distance at which the pump unit 2 is maintained above the floor of the storage tank. For this purpose, a reference arm 5 may be supported from the roof of the tank adjacent the manhole 4. As the reference arm 5 will be at a fixed and known distance from the bottom of the storage tank, by knowing the length of the standpipe I above the pump unit 2, relative to reference arm 5, the distance of the pump unit 2 above the bottom of the tank will be known.

The principle upon which the gauging device of this invention operates may be understood by reference to Fig. 1, heretofore described. It is apparent that on lowering the standpipe I and the pumping unit 2 into the storage tank, operation of the pump 2 to maintain the level of fluid in the standpipe at the same point as the level of fluid in the storage tank will necessitate rotation of the pump for a number of revolutions proportional to the depth of fluid maintained in the standpipe. Consequently, by determining the number of pump revolutions required, to balance the fluid in the standpipe with the fluid in the storage tank and by knowing the distance of the pumping unit from the bottom of the storage tank, it is possible to compute the level of the material in the storage tank.

The apparatus required to balance the fluid in the standpipe in this manner is fully illustrated in Fig. 2. In this figure, the numeral I again identifies the standpipe shown in Fig. 1, and the numeral 2 generally designates the pumping unit at the bottom of the standpipe. This pumping unit is maintained in a suitable housing 33 and consists of a reversible positive displacement pump 34 and a diaphragm control valve 35. If desired, a filter 6 may also be included to filter any sediment or foreign matter from fluid withdrawn from the storage tank and passed through the pump. While the pump employed may be any desired type of positive displacement pump, it is preferred that the pump consist of a small gear pump, as schematically indicated. A conduit 7 leads from an opening in the housing 33 to the filter 6 connecting to a conduit 8 leading to the pump 34. The filter 6 may consist of a cartridge inserted in the housing 33 containing wire mesh screen, fibre glass, or any other desired type of packing and filtering material. A fluid line 9 extends from the pump 34 to the standpipe I which is preferably sealed off from the pump unit by means of the blank or plug 10. By virtue of the fact that the pump 34 is a reversible pump, fluid may be pumped through lines 7, 8 and 9 into the standpipe 1 above the blank 10 or fluid may be pumped from the standpipe 1 through lines 9, 8 and 7 to the main body of fluid maintained in the storage tank.

To control the operation of the pump, a diaphragm operated switch 35 is employed. As illustrated, the switch 35 consists of a suitable diaphragm, preferably metallic, which may be supported in a sub-housing 11. Fluid inlets and outlets are provided to the sub-housing 11 so that fluid may enter the housing on either side of the diaphragm 12. Thus, a conduit 13 is provided through housing 33 to introduce fluid to one side of the diaphragm 12, while a conduit 14 provides a fluid passageway from the inside of the standpipe 1 to the opposite side of the diaphragm 12. By positioning electrical contact on either side the diaphragm, movement of the diaphragm may actuate electrical circuits through the electrical contacts 15 or 16 maintained adjacent the contacts of the diaphragm. Thus, if the fluid level maintained in standpipe 1 is lower than the level of fluid maintained in the storage tank, the diaphragm 12 will be pushed to the left to close an electrical circuit including the diaphragm and the contact 15. Alternatively, if fluid in standpipe 1 is at a level above the fluid in the storage tank, the diaphragm will be moved to close an electrical circuit through contact 16. For simplicity, the electrical connections between the switch 35 and the pump 34 have not been shown in Fig. 2. It may be appreciated, however, that the switch may readily be connected to the pump 34 so as to activate this pump in a manner to maintain the fluid in the standpipe 1 at the same level as the fluid in the storage tank. Power leads to the pump 34 and conductors for the remote indication of the rotation of pump 34 may be brought to the housing 33 through a cable 17 positioned in standpipe 1.

Referring now to Fig. 3, the manner in which the different elements of the apparatus described are connected may be understood. In Fig. 3, elements similar to those illustrated in Fig. 2 are identified by the same numerals. As illustrated, a power lead 37 is connected to the diaphragm 12, and a second power lead 18 is connected to the reversible motor 19 associated with the pump 34. The electrical circuit to the pump is completed through leads 20 or 21 connected to the electrical contacts 15 or 16 associated with the diaphragm 12. Consequently, the direction of rotation of motor 19 may be controlled by movement of diaphragm 12 and by the consequent closure of the motor power circuit either through contact 15 or contact 16. In order to follow the operation of pump 34, either at the top of the tank or at a remote point, a revolution counter 25 may be connected to the pump 34. The revolution counter, of conventional construction, is of the type producing an electrical signal indicative of the number of revolutions through which the pump 34 is turned. Thus, the electrical leads 26 and 27 may lead from the revolution counter 25 to any desired point. Alternatively, other means may be employed to determine the extent and direction of rotation of pump 34. For example, a Selsyn motor may be associated with pump 34 in conjunction with a second Selsyn motor at any desired remote point so that the operation of the Selsyn motor associated with the pump will cause identical operation of the associated Selsyn motor at the remote point.

It is apparent that the general apparatus heretofore described may be considerably altered to secure simple and compact construction. Thus, for example, pump 34 may consist of a sufficiently small pump so that the necessary motor and power supply may actually be positioned in the housing 33 at the bottom of the standpipe 1. For this purpose it is possible to employ suitable pumps driven by compact batteries. Again, the general layout of the apparatus described, the fluid connections, and the other elements of the apparatus may be more simply provided than in the diagrammatic manner depicted in the drawing. It is therefore to be understood that the present invention is not limited to the specific embodiment illustrated and described but rather is defined by the following claims.

What is claimed is:

1. In apparatus for gauging the level of fluid in a tank, the combination including a standpipe supported in the said tank, the upper end of said standpipe being open and extending above the level of fluid in the tank and the lower end of said standpipe being closed, a reversible positive displacement pump, a fluid passageway extending between fluid in the tank and the inner portion of the standpipe at a point adjacent the lower end of the standpipe through the said pump whereby fluid may be pumped therebetween, means to actuate the pump in a direction determined by pressure differences between fluid in the standpipe and fluid in the tank, and means to indicate the rotation of the pump.

2. The apparatus defined by claim 1 wherein said means to actuate the pump consists of a diaphragm switch having one side of the diaphragm subjected to the pressure of fluid in the standpipe and the other side of the diaphragm subjected to the pressure of fluid in the tank.

3. The apparatus defined by claim 1, including a filter positioned in the said fluid passageway.

4. Gauging apparatus comprising in combination an elongated tubular member adapted to extend into a tank containing fluid to be gauged and normally maintained in a vertical position, the upper end of said tubular member being open and the lower end being closed, a reversible positive displacement pump fixed to a lower portion of said tubular member, a fluid passageway extending through said pump into the lower portion of the tubular member, switch control means connected to said pump adapted to cause rotation of the pump in a direction determined by the pressure differential of fluid inside and outside the said tubular member, and means to indicate the number of revolutions of the pump.

5. The apparatus defined by claim 4, including a filter positioned in the said fluid passageway.

JOHN J. HEIGL.

References Cited in the file of this patent

UNITED STATES PATENTS

| Number | Name | Date |
|---|---|---|
| 1,361,576 | Anderson | Dec. 7, 1920 |
| 1,954,142 | Moffett | Apr. 10, 1934 |
| 1,974,857 | Winton | Sept. 25, 1934 |
| 2,168,106 | Sauer | Aug. 1, 1939 |
| 2,276,794 | Ricci | Mar. 17, 1942 |

FOREIGN PATENTS

| Number | Country | Date |
|---|---|---|
| 356,945 | Germany | Sept. 17, 1931 |
| 853,933 | France | Dec. 23, 1939 |